(12) United States Patent
Beeson

(10) Patent No.: US 11,475,785 B2
(45) Date of Patent: *Oct. 18, 2022

(54) WELD TRAINING SYSTEMS AND METHODS

(71) Applicant: Illinois Tool Works Inc., Glenview, IL (US)

(72) Inventor: Richard Beeson, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/115,281

(22) Filed: Dec. 8, 2020

(65) Prior Publication Data

US 2021/0090454 A1 Mar. 25, 2021

Related U.S. Application Data

(63) Continuation of application No. 15/840,104, filed on Dec. 13, 2017, now Pat. No. 10,861,345, which is a
(Continued)

(51) Int. Cl.
*G09B 9/00* (2006.01)
*G09B 19/00* (2006.01)
(Continued)

(52) U.S. Cl.
CPC .............. *G09B 9/00* (2013.01); *B23K 9/0956* (2013.01); *B23K 9/167* (2013.01); *B23K 9/173* (2013.01);
(Continued)

(58) Field of Classification Search
CPC .................................. G09B 9/00; G09B 19/24
See application file for complete search history.

(56) References Cited

U.S. PATENT DOCUMENTS

| 1,340,270 A | 5/1920 | Emil |
| 2,045,800 A | 6/1936 | Walther |

(Continued)

FOREIGN PATENT DOCUMENTS

| CA | 2311685 | 12/2001 |
| CA | 2517874 | 12/2001 |

(Continued)

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.

(Continued)

*Primary Examiner* — Robert J Utama
(74) *Attorney, Agent, or Firm* — McAndrews, Held & Malloy, Ltd.

(57) ABSTRACT

An example weld training system includes: a weld training device configured to perform a simulated welding procedure on a simulated weld joint; a work surface comprising the simulated weld joint; a sensing device configured to track weld training device location information during the simulated welding procedure; a visual interface configured to display results of the simulated welding procedure based on the weld training device location information; and an enclosure comprising an interior volume configured to house within its interior the visual interface, the work surface, and the sensing device.

13 Claims, 3 Drawing Sheets

Related U.S. Application Data continuation of application No. 14/462,286, filed on Aug. 18, 2014, now Pat. No. 9,875,665.

(51) Int. Cl.
  *G09B 19/24* (2006.01)
  *B23K 9/095* (2006.01)
  *B23K 9/167* (2006.01)
  *B23K 9/173* (2006.01)
  *B23K 9/32* (2006.01)
  *B23K 10/00* (2006.01)

(52) U.S. Cl.
  CPC .............. *B23K 9/322* (2013.01); *B23K 10/00* (2013.01); *G09B 19/003* (2013.01); *G09B 19/24* (2013.01)

(56) References Cited

U.S. PATENT DOCUMENTS

| | | |
|---|---|---|
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,391,691 A | 7/1968 | Young |
| 3,679,865 A | 7/1972 | Jesnitzer |
| 3,867,769 A | 2/1975 | Schow |
| 4,028,522 A | 6/1977 | Chihoski |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,253,648 A | 3/1981 | Meeks |
| 4,294,440 A | 10/1981 | Severt |
| 4,375,026 A | 2/1983 | Kearney |
| 4,375,165 A | 3/1983 | Desterke |
| 4,389,561 A | 6/1983 | Weman |
| 4,396,945 A | 8/1983 | Dimatteo |
| 4,412,121 A | 10/1983 | Kremers |
| 4,452,589 A | 6/1984 | Denison |
| 4,459,114 A | 7/1984 | Barwick |
| 4,471,207 A | 9/1984 | Hawkes |
| 4,484,059 A | 11/1984 | Lillquist |
| 4,518,361 A | 5/1985 | Conway |
| 4,541,055 A | 9/1985 | Wolfe |
| 4,555,614 A | 11/1985 | Morris |
| 4,577,499 A | 3/1986 | Silke |
| 4,590,356 A | 5/1986 | Povlick |
| 4,591,689 A | 5/1986 | Brown |
| 4,594,497 A | 6/1986 | Takahashi |
| 4,595,186 A | 6/1986 | Reed |
| 4,595,368 A | 6/1986 | Cole |
| 4,595,820 A | 6/1986 | Richardson |
| 4,609,806 A | 9/1986 | Grabkowski |
| 4,628,176 A | 12/1986 | Kojima |
| 4,638,146 A | 1/1987 | Koyama |
| 4,677,277 A | 6/1987 | Cook |
| 4,680,014 A | 7/1987 | Paton |
| 4,689,021 A | 8/1987 | Vasiliev |
| 4,716,273 A | 12/1987 | Paton |
| 4,721,947 A | 1/1988 | Brown |
| 4,728,768 A | 3/1988 | Cueman |
| 4,739,404 A | 4/1988 | Richardson |
| 4,767,109 A | 8/1988 | Raketich |
| 4,829,365 A | 5/1989 | Eichenlaub |
| 4,830,261 A | 5/1989 | Mello |
| 4,867,685 A | 9/1989 | Brush |
| 4,868,649 A | 9/1989 | Gaudin |
| 4,877,940 A | 10/1989 | Bangs |
| 4,881,678 A | 11/1989 | Gaudin |
| 4,920,249 A | 4/1990 | McLaughlin |
| 4,931,018 A | 6/1990 | Herbst et al. |
| 4,937,427 A | 6/1990 | McVicker |
| 4,943,702 A | 7/1990 | Richardson |
| 4,954,690 A | 9/1990 | Kensrue |
| 4,992,881 A | 2/1991 | Tomasek |
| 4,996,409 A | 2/1991 | Paton |
| 5,061,841 A | 10/1991 | Richardson |
| 5,103,376 A | 4/1992 | Blonder |
| 5,185,561 A | 2/1993 | Good |
| 5,208,436 A | 5/1993 | Blankenship |
| 5,211,564 A | 5/1993 | Martinez |
| 5,231,928 A | 8/1993 | Phillips |
| 5,243,265 A | 9/1993 | Matsuura |
| 5,283,418 A | 2/1994 | Bellows |
| 5,302,799 A | 4/1994 | Kennedy |
| 5,304,774 A | 4/1994 | Durheim |
| 5,306,893 A | 4/1994 | Morris |
| 5,320,538 A | 6/1994 | Baum |
| 5,343,011 A | 8/1994 | Fujii |
| 5,380,978 A | 1/1995 | Pryor |
| 5,397,872 A | 3/1995 | Baker |
| 5,404,181 A | 4/1995 | Hung |
| 5,426,732 A | 6/1995 | Boies |
| 5,448,405 A | 9/1995 | Clausen |
| 5,464,957 A | 11/1995 | Kidwell |
| 5,508,757 A | 4/1996 | Chen |
| 5,514,846 A | 5/1996 | Cecil |
| 5,517,420 A | 5/1996 | Kinsman |
| 5,521,843 A | 5/1996 | Hashima |
| 5,533,146 A | 7/1996 | Iwai |
| 5,543,863 A | 8/1996 | Lin |
| 5,546,476 A | 8/1996 | Mitaka |
| 5,571,431 A | 11/1996 | Lantieri |
| 5,592,241 A | 1/1997 | Kita |
| 5,617,335 A | 4/1997 | Hashima |
| 5,659,479 A | 8/1997 | Duley |
| 5,668,612 A | 9/1997 | Hung |
| 5,674,415 A | 10/1997 | Leong |
| 5,675,229 A | 10/1997 | Thorne |
| 5,681,490 A | 10/1997 | Chang |
| 5,708,253 A | 1/1998 | Bloch |
| 5,709,219 A | 1/1998 | Chen |
| 5,747,042 A | 5/1998 | Choquet |
| 5,823,785 A | 10/1998 | Matherne, Jr. |
| 5,832,139 A | 11/1998 | Batterman |
| 5,845,053 A | 12/1998 | Watanabe |
| 5,856,844 A | 1/1999 | Batterman |
| 5,930,093 A | 7/1999 | Morrissett |
| 5,961,859 A | 10/1999 | Chou |
| 5,973,677 A | 10/1999 | Gibbons |
| 5,999,909 A | 12/1999 | Rakshit |
| 6,003,052 A | 12/1999 | Yamagata |
| 6,018,729 A | 1/2000 | Zacharia |
| 6,019,359 A | 2/2000 | Fly |
| 6,024,273 A | 2/2000 | Ludewig |
| 6,033,226 A | 3/2000 | Bullen |
| 6,039,494 A | 3/2000 | Pearce |
| 6,046,754 A | 4/2000 | Stanek |
| 6,049,059 A | 4/2000 | Kim |
| 6,051,805 A | 4/2000 | Vaidya |
| 6,101,455 A | 8/2000 | Davis |
| 6,107,601 A | 8/2000 | Shimagama |
| 6,130,407 A | 10/2000 | Villafuerte |
| 6,136,946 A | 10/2000 | Yao |
| 6,153,848 A | 11/2000 | Nagae |
| 6,155,475 A | 12/2000 | Ekelof |
| 6,163,946 A | 12/2000 | Pryor |
| 6,226,395 B1 | 5/2001 | Gilliland |
| 6,236,017 B1 | 5/2001 | Smartt et al. |
| 6,242,711 B1 | 6/2001 | Cooper |
| 6,271,500 B1 | 8/2001 | Hirayama |
| 6,288,359 B1 | 9/2001 | Koch |
| 6,290,740 B1 | 9/2001 | Schaefer |
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,417,894 B1 | 7/2002 | Goff |
| 6,441,342 B1 | 8/2002 | Hsu |
| 6,445,964 B1 | 9/2002 | White |

(56) References Cited

U.S. PATENT DOCUMENTS

| | | |
|---|---|---|
| 6,469,752 B1 | 10/2002 | Ishikawa |
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,622,906 B1 | 9/2003 | Kushibe |
| 6,647,288 B2 | 11/2003 | Madill |
| 6,670,574 B1 | 12/2003 | Bates |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,748,249 B1 | 6/2004 | Eromaki |
| 6,750,428 B2 | 6/2004 | Okamoto |
| 6,753,909 B1 | 6/2004 | Westerman |
| 6,768,974 B1 | 7/2004 | Nanjundan |
| 6,795,068 B1 | 9/2004 | Marks |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,967,635 B2 | 11/2005 | Hung |
| 6,977,357 B2 | 12/2005 | Hsu |
| 6,995,536 B2 | 2/2006 | Challoner |
| 7,015,419 B2 | 3/2006 | Hackl |
| 7,025,053 B1 | 4/2006 | Altamirano |
| 7,032,814 B2 | 4/2006 | Blankenship |
| 7,045,742 B2 | 5/2006 | Feichtinger |
| 7,081,888 B2 | 7/2006 | Cok |
| 7,120,473 B1 | 10/2006 | Hawkins |
| 7,132,617 B2 | 11/2006 | Lee |
| 7,132,623 B2 | 11/2006 | Demiranda |
| 7,150,047 B2 | 12/2006 | Fergason |
| 7,173,215 B1 | 2/2007 | Kapoor |
| 7,181,413 B2 | 2/2007 | Hadden |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | Lemay |
| 7,474,760 B2 | 1/2009 | Hertzman |
| 7,523,069 B1 | 4/2009 | Friedl et al. |
| 7,564,005 B2 | 7/2009 | Cabanaw |
| 7,574,172 B2 | 8/2009 | Clark et al. |
| 7,577,285 B2 | 8/2009 | Schwarz |
| D614,217 S | 4/2010 | Peters |
| 7,698,094 B2 | 4/2010 | Aratani |
| D615,573 S | 5/2010 | Peters |
| 7,766,213 B2 | 8/2010 | Henrikson |
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 8,019,144 B2 | 9/2011 | Sugihara |
| 8,044,942 B1 | 10/2011 | Leonhard |
| 8,046,178 B2 | 10/2011 | Dai |
| 8,100,694 B2 | 1/2012 | Portoghese |
| 8,110,774 B2 | 2/2012 | Huonker |
| 8,235,588 B2 | 8/2012 | Louban |
| 8,248,324 B2 | 8/2012 | Nangle |
| 8,274,013 B2 | 9/2012 | Wallace |
| 8,393,519 B2 | 3/2013 | Allehaux |
| 8,406,682 B2 | 3/2013 | Elesseily |
| 8,431,862 B2 | 4/2013 | Kachline |
| 8,432,476 B2 | 4/2013 | Ashforth |
| 8,502,866 B2 | 8/2013 | Becker |
| 8,512,043 B2 | 8/2013 | Choquet |
| 8,541,746 B2 | 9/2013 | Andres |
| 8,657,605 B2 | 2/2014 | Wallace |
| 8,681,178 B1 | 3/2014 | Tseng |
| 8,692,157 B2 | 4/2014 | Daniel |
| 8,698,843 B2 | 4/2014 | Tseng |
| 8,747,116 B2 | 6/2014 | Zboray et al. |
| 8,777,629 B2 | 7/2014 | Kreindl |
| 8,803,908 B2 | 8/2014 | Van Osten |
| 8,834,168 B2 | 9/2014 | Peters |
| 8,851,896 B2 | 10/2014 | Wallace |
| 8,860,760 B2 | 10/2014 | Chen |
| 8,911,237 B2 | 12/2014 | Postlethwaite |
| 8,915,740 B2 | 12/2014 | Zboray |
| 8,946,595 B2 | 2/2015 | Ishida |
| 8,953,033 B2 | 2/2015 | Yamane |
| 8,953,909 B2 | 2/2015 | Guckenberger |
| 8,987,628 B2 | 3/2015 | Daniel et al. |
| 8,990,842 B2 | 3/2015 | Rowley |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,089,921 B2 | 7/2015 | Daniel |
| 9,196,169 B2 | 11/2015 | Wallace |
| 9,218,745 B2 | 12/2015 | Choquet |
| 9,230,449 B2 | 1/2016 | Conrardy |
| 9,269,279 B2 | 2/2016 | Penrod et al. |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,402,122 B2 | 7/2016 | Richardson |
| 9,573,215 B2 | 2/2017 | Pfeifer |
| 2001/0026445 A1 | 10/2001 | Naghi |
| 2001/0032508 A1 | 10/2001 | Lemkin |
| 2002/0017752 A1 | 2/2002 | Levi |
| 2002/0043607 A1 | 4/2002 | Tajima |
| 2002/0071550 A1 | 6/2002 | Pletikosa |
| 2002/0105797 A1 | 8/2002 | Navid |
| 2002/0114653 A1 | 8/2002 | Gatta |
| 2002/0148745 A1 | 10/2002 | Chang |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0058703 A1 | 3/2004 | Eromaki |
| 2004/0068335 A1 | 4/2004 | Ferla |
| 2004/0069754 A1 | 4/2004 | Bates |
| 2004/0175684 A1 | 9/2004 | Kaasa |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu |
| 2005/0012598 A1 | 1/2005 | Berquist |
| 2005/0016979 A1 | 1/2005 | Stein |
| 2005/0017152 A1 | 1/2005 | Fergason |
| 2005/0073506 A1 | 4/2005 | Durso |
| 2005/0099102 A1 | 5/2005 | Villarreal |
| 2005/0127052 A1 | 6/2005 | Spencer |
| 2005/0133488 A1 | 6/2005 | Blankenship |
| 2005/0135682 A1 | 6/2005 | Abrams |
| 2005/0179654 A1 | 8/2005 | Hawkins |
| 2005/0197115 A1 | 9/2005 | Clark et al. |
| 2005/0207102 A1 | 9/2005 | Russo |
| 2005/0227635 A1 | 10/2005 | Hawkins |
| 2005/0256611 A1 | 11/2005 | Pretlove |
| 2006/0010551 A1 | 1/2006 | Bishop |
| 2006/0081740 A1 | 4/2006 | Bellavance |
| 2006/0136183 A1 | 6/2006 | Choquet |
| 2006/0151446 A1 | 7/2006 | Schneider |
| 2006/0163228 A1 | 7/2006 | Daniel |
| 2006/0173619 A1 | 8/2006 | Brant |
| 2006/0212169 A1 | 9/2006 | Luthardt |

(56) References Cited

U.S. PATENT DOCUMENTS

| | | |
|---|---|---|
| 2006/0241432 A1 | 10/2006 | Herline |
| 2007/0038400 A1 | 2/2007 | Lee |
| 2007/0051711 A1 | 3/2007 | Kachline |
| 2007/0114215 A1 | 5/2007 | Bill |
| 2007/0115202 A1 | 5/2007 | Kiesenhofer |
| 2007/0164006 A1 | 7/2007 | Burgstaller |
| 2007/0187378 A1 | 8/2007 | Karakas |
| 2007/0188606 A1 | 8/2007 | Atkinson |
| 2007/0221636 A1 | 9/2007 | Monzyk |
| 2007/0247793 A1 | 10/2007 | Carnevali |
| 2007/0248261 A1 | 10/2007 | Zhou |
| 2007/0264620 A1 | 11/2007 | Maddix |
| 2007/0278196 A1 | 12/2007 | James |
| 2007/0291166 A1 | 12/2007 | Misawa |
| 2008/0030631 A1 | 2/2008 | Gallagher |
| 2008/0038702 A1 | 2/2008 | Choquet |
| 2008/0061113 A9 | 3/2008 | Seki |
| 2008/0077422 A1 | 3/2008 | Dooley |
| 2008/0124698 A1 | 5/2008 | Ebensberger |
| 2008/0128395 A1 | 6/2008 | Aigner |
| 2008/0149602 A1 | 6/2008 | Lenzner |
| 2008/0149608 A1 | 6/2008 | Albrecht |
| 2008/0158502 A1 | 7/2008 | Becker |
| 2008/0168290 A1 | 7/2008 | Jobs |
| 2008/0169277 A1 | 7/2008 | Achtner |
| 2008/0234960 A1 | 9/2008 | Byington |
| 2008/0314887 A1 | 12/2008 | Stoger |
| 2009/0005728 A1 | 1/2009 | Weinert |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson et al. |
| 2009/0189974 A1 | 7/2009 | Deering |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0249606 A1 | 10/2009 | Diez |
| 2009/0283021 A1 | 11/2009 | Wong |
| 2009/0298024 A1 | 12/2009 | Batzler |
| 2009/0323121 A1 | 12/2009 | Valkenburg |
| 2010/0020483 A1 | 1/2010 | Ma |
| 2010/0048273 A1 | 2/2010 | Wallace |
| 2010/0062405 A1 | 3/2010 | Zboray |
| 2010/0062406 A1 | 3/2010 | Zboray |
| 2010/0088793 A1 | 4/2010 | Ghisleni |
| 2010/0123664 A1 | 5/2010 | Shin |
| 2010/0133247 A1 | 6/2010 | Mazumder |
| 2010/0145520 A1 | 6/2010 | Gerio |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky |
| 2010/0245273 A1 | 9/2010 | Hwang |
| 2010/0283588 A1 | 11/2010 | Gomez |
| 2010/0291313 A1 | 11/2010 | Ling |
| 2010/0314362 A1 | 12/2010 | Albrecht |
| 2011/0000892 A1 | 1/2011 | Mueller |
| 2011/0006047 A1 | 1/2011 | Penrod |
| 2011/0091846 A1* | 4/2011 | Kreindl ................ G09B 25/02 434/234 |
| 2011/0092828 A1 | 4/2011 | Spohn |
| 2011/0117527 A1 | 5/2011 | Conrardy |
| 2011/0176720 A1 | 7/2011 | Vanosten |
| 2011/0183304 A1 | 7/2011 | Wallace |
| 2011/0198329 A1 | 8/2011 | Davidson |
| 2011/0220616 A1 | 9/2011 | Mehn |
| 2011/0220619 A1 | 9/2011 | Mehn |
| 2011/0240605 A1 | 10/2011 | Takayama |
| 2011/0249090 A1 | 10/2011 | Moore |
| 2011/0284508 A1 | 11/2011 | Miura |
| 2011/0286005 A1 | 11/2011 | Yamamoto |
| 2011/0290765 A1 | 12/2011 | Albrecht |
| 2011/0313731 A1 | 12/2011 | Vock |
| 2012/0007748 A1 | 1/2012 | Forgues |
| 2012/0048838 A1 | 3/2012 | Ishida |
| 2012/0072021 A1 | 3/2012 | Walser |
| 2012/0077174 A1 | 3/2012 | Depaul |
| 2012/0105476 A1 | 5/2012 | Tseng |
| 2012/0113512 A1 | 5/2012 | Tsanev |
| 2012/0122062 A1 | 5/2012 | Yang et al. |
| 2012/0175834 A1 | 7/2012 | Hamm |
| 2012/0180180 A1 | 7/2012 | Steve |
| 2012/0188365 A1 | 7/2012 | Stork |
| 2012/0189993 A1* | 7/2012 | Kindig ................ G09B 19/24 434/234 |
| 2012/0205359 A1 | 8/2012 | Daniel |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1 | 11/2012 | Conrardy |
| 2012/0323496 A1 | 12/2012 | Burroughs |
| 2013/0040270 A1 | 2/2013 | Albrecht |
| 2013/0081293 A1 | 4/2013 | Delin |
| 2013/0182070 A1 | 7/2013 | Peters |
| 2013/0189656 A1 | 7/2013 | Zboray |
| 2013/0189657 A1 | 7/2013 | Wallace |
| 2013/0189658 A1 | 7/2013 | Peters |
| 2013/0200882 A1 | 8/2013 | Almalki |
| 2013/0206741 A1 | 8/2013 | Pfeifer et al. |
| 2013/0209976 A1 | 8/2013 | Postlethwaite |
| 2013/0262000 A1 | 10/2013 | Hutchison et al. |
| 2013/0264315 A1 | 10/2013 | Hung |
| 2013/0264322 A1 | 10/2013 | Bornemann |
| 2013/0288211 A1 | 10/2013 | Patterson |
| 2013/0326842 A1 | 12/2013 | Pearson |
| 2014/0008088 A1 | 1/2014 | Chellew |
| 2014/0017642 A1 | 1/2014 | Postlethwaite |
| 2014/0042135 A1 | 2/2014 | Daniel et al. |
| 2014/0042137 A1 | 2/2014 | Daniel et al. |
| 2014/0069899 A1 | 3/2014 | Mehn |
| 2014/0131337 A1 | 5/2014 | Williams |
| 2014/0134579 A1 | 5/2014 | Becker |
| 2014/0134580 A1 | 5/2014 | Becker |
| 2014/0184496 A1 | 7/2014 | Gribetz |
| 2014/0220522 A1 | 8/2014 | Peters |
| 2014/0234813 A1 | 8/2014 | Peters |
| 2014/0263224 A1 | 9/2014 | Becker |
| 2014/0263227 A1 | 9/2014 | Daniel et al. |
| 2014/0267773 A1 | 9/2014 | Jeung |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0322684 A1 | 10/2014 | Wallace |
| 2014/0346158 A1 | 11/2014 | Matthews |
| 2014/0346163 A1 | 11/2014 | Rajagopalan |
| 2014/0346793 A1 | 11/2014 | Destories |
| 2014/0374396 A1 | 12/2014 | Luo et al. |
| 2015/0056584 A1 | 2/2015 | Boulware |
| 2015/0056585 A1 | 2/2015 | Boulware |
| 2015/0072323 A1 | 3/2015 | Postlethwaite |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | Delisio |
| 2015/0235565 A1 | 8/2015 | Postlethwaite |
| 2015/0248845 A1 | 9/2015 | Postlethwaite |
| 2015/0325153 A1 | 11/2015 | Albrecht |
| 2015/0352653 A1 | 12/2015 | Albrecht |
| 2015/0375323 A1 | 12/2015 | Becker |
| 2015/0375324 A1 | 12/2015 | Becker |
| 2015/0375327 A1 | 12/2015 | Becker |
| 2015/0379894 A1 | 12/2015 | Becker |
| 2016/0039034 A1 | 2/2016 | Becker |

(56) References Cited

U.S. PATENT DOCUMENTS

| | | |
|---|---|---|
| 2016/0039053 A1 | 2/2016 | Becker |
| 2016/0093233 A1 | 3/2016 | Boulware |
| 2016/0203734 A1 | 7/2016 | Boulware |
| 2016/0203735 A1 | 7/2016 | Boulware |
| 2016/0236303 A1 | 8/2016 | Matthews |

FOREIGN PATENT DOCUMENTS

| | | |
|---|---|---|
| CA | 2549553 | 7/2004 |
| CA | 2554498 | 4/2006 |
| CN | 1866317 | 11/2006 |
| CN | 1909020 | 2/2007 |
| CN | 201181527 | 1/2009 |
| CN | 102049595 | 5/2011 |
| CN | 102165505 | 8/2011 |
| CN | 202200202 | 4/2012 |
| CN | 103038804 | 4/2013 |
| CN | 202877704 | 4/2013 |
| DE | 202010011064 | 10/2010 |
| DE | 102010038902 | 2/2012 |
| EP | 0323277 | 7/1989 |
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 1864744 | 12/2007 |
| EP | 2415560 | 2/2014 |
| ES | 2438440 | 1/2014 |
| FR | 1456780 | 7/1966 |
| FR | 2827066 | 1/2003 |
| GB | 2454232 A | 5/2009 |
| JP | H11146387 | 5/1999 |
| JP | 2000298427 | 10/2000 |
| JP | 2004181493 | 7/2004 |
| JP | 2007021542 | 2/2007 |
| JP | 2009125790 | 6/2009 |
| KR | 100876425 | 12/2008 |
| SU | 972552 | 11/1982 |
| SU | 1354234 | 11/1987 |
| SU | 1489933 | 6/1989 |
| SU | 1638145 | 3/1991 |
| WO | 9958286 | 11/1999 |
| WO | 03019349 | 1/2003 |
| WO | 2004057554 | 7/2004 |
| WO | 2005102230 | 11/2005 |
| WO | 2005110658 | 11/2005 |
| WO | 2006004427 | 1/2006 |
| WO | 2006034571 | 4/2006 |
| WO | 2007009131 | 1/2007 |
| WO | 2007044135 | 4/2007 |
| WO | 2008076777 | 6/2008 |
| WO | 2009022443 | 2/2009 |
| WO | 2009053829 | 4/2009 |
| WO | 2009060231 | 5/2009 |
| WO | 2009092944 | 7/2009 |
| WO | 2009146359 | 12/2009 |
| WO | 2010000003 | 1/2010 |
| WO | 2010020867 | 2/2010 |
| WO | 2010020869 | 2/2010 |
| WO | 2010020870 | 2/2010 |
| WO | 2010111722 | 10/2010 |
| WO | 2011112493 | 9/2011 |
| WO | 2011150165 | 12/2011 |
| WO | 2012036710 | 3/2012 |
| WO | 2012137060 | 10/2012 |
| WO | 2013023012 | 2/2013 |
| WO | 2013138831 | 9/2013 |
| WO | 2014007830 | 1/2014 |
| WO | 2014074296 | 5/2014 |
| WO | 2014140719 | 9/2014 |

OTHER PUBLICATIONS

"NJC Technology Displayed at ShipTech 2005", Welding Journal, vol. 84, No. 3, Mar. 2005, p. 54, https://app.aws.org/w/r/www/wj/2005/03/WJ_2005_03.pdf.

"Sheet Metal Conference XXII," Conference Program, American Welding Society, May 2006, Detroit.

"SOLDAMATIC: Augmented Training Technology for Welding," Seabery Augmented Training Technology, Seabery Soluciones, 2011.

"Virtual Reality Program to Train Welders for Shipbuilding", American Welding Society, Navy Joining Center, https://app.aws.org/wj/2004/04/052/.

"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.

"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.

"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.

"Vision for Welding Industry," American Welding Society, Apr. 22, 1999, http://www.aws.org/library/doclib/vision.pdf.

"Welding in Defense Industry," American Welding Society conference schedule, 2004. https://app.aws.org/conferences/defense/live_index.html.

"Welding Technology Roadmap," prepared by Energetics, Inc., Columbia, MD, in cooperation with The American Welding Society and The Edison Welding Institute, Sep. 2000.

123arc.com—"Weld into the future"; 2000.

Advance Program of American Welding Society Programs and Events, Nov. 11-14, 2007, Chicago.

Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.

Aiteanu, Dorin, et al., "A Step Forward in Manual Welding: Demonstration of Augmented Reality Helmet," Institute of Automation, University of Bremen, Germany, 2003.

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).

American Welding Society Forms: typical Procedure Qualification Record and Welding Procedure Specification forms.

American Welding Society's Virtual Welding Trailer to Debut at FABTECH Careers in Welding Trailer Appeals to New Generation of Welders, Miami, Florida, Nov. 3, 2011.

ArcSentry Weld Monitoring System, Version 3, Users Manual, Native American Technologies, Golden, CO, Dec. 10, 1999.

ARVIKA Forum Vorstellung Projeckt PAARA, BMW Group Virtual Reality Center, Nuernberg, 2003.

Ascension Technology Corporation: Tracking 3D Worlds: http://ascension-tech.com/, Dec. 1996.

Barckhoff, J.R.; "Total Welding Managemet," American Welding Society, 2005.

Bender Shipbuilding and Repair, Co., "Virtual Welding—A Low Cost Virtual Reality Welder Training System", Technical Proposal, Jan. 23, 2008.

Byrd, Alex Preston, "Identifying the effects of human factors and training methods on a weld training program" (2014). Graduate Theses and Dissertations. Paper 13991.

Canadan Office Action Appln No. 2,955,778 dated Nov. 9, 2017.

Central Welding Supply http://www.welders-direct.com/ Feb. 29, 2000.

Cho, Min Hyn, Numerical Simulation F Arc Welding Process and its Application Dissertation for Ohio State University by Min Hyun Cho, M.S. 2006: See Internet as this document is security protected)

(56) References Cited

OTHER PUBLICATIONS ohttps://etd.ohiolink.edu/ap:0:0:APPLICATION_PROCESS=DOWNLOAD_ETD_SUB_DOC_ACCNUM:::F1501_ID:osu1155741113, attachment.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19 -22, 2007.
EWI, "EWI ArcCheck," marketing brochure, Columbus, Ohio, 1 page.
EWI, "EWI SkillBuilder," marketing brochure, Columbus, Ohio, 1 page.
Fast et al., "National Shipbuilding Research Program (NSRP) ASE Technology Investment Agreement on Virtual Welding—A Low Cost Virtual Reality Welder Training System", Feb. 29, 2012.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/plV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius Perfect Welding; 06,3082, EN v01 2010 aw05; Virtual Welding—The training method of the future; Feb. 20, 2012.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality-Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
Hodgson, et al. "Virtual Reality in the Wild: A Self-Contained and Wearable Simulation System." IEEE Virtual Reality, Mar. 4-8, 2012, Orange County, CA USA.
http://www.123arc.com "Simulation and Certification"; 2000.
Image from Sim Welder.com—R-V's Welder Training Goes Virtual, www.rvii.com/PDF/simwelder.pdf; Jan. 2010.
Impact Spring 2012 vol. 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
International Search Report for PCT application No. PCT/US2013/038371, dated Jul. 31, 2013, 8 pgs.
International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.
International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.

(56) References Cited

OTHER PUBLICATIONS

International Search Report from PCT application No. PCT/US2014/018103, dated Jun. 30, 2014, 13 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058567, dated May 6, 2016, 15 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058664, dated Apr. 25, 2016, 17 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
International Search Report from PCT application No. PCT/US2016/023612, dated Jul. 18, 2016, 11 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kiwinakiful; Holographic TV coming 2012 (as seen on BBC); http://www.youtube.com/watch?v=Ux6aD6vE9sk&feature=related, Jul. 2, 2011.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
Maccormick, John; How does the Kinect work?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid . . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al, EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Quebec International, May 28, 2008 'Video Game' Technology to Fill Growing Need; http://www.mri.gouv.qc.ca/portail/_scripts/actualities/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .
TeachWELD: Welding Simulator/Hands-On Learning for Welding: http://realityworks.com/products/teachweld-welding-simulator; 2012.
The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.

(56) References Cited

OTHER PUBLICATIONS

VRTEX 360 Operator's Manual, Lincoln Electric, Oct. 2012.
VRTEX 360, Lincoln Electric, Dec. 2009.
Welding Journal, American Welding Society, Nov. 2007, https://app.aws.org/wj/2007/11/WJ_2007_11.pdf.

* cited by examiner

WELD TRAINING SYSTEMS AND METHODS

RELATED APPLICATIONS

This patent is a continuation of U.S. patent application Ser. No. 15/840,104, filed Dec. 13, 2017, entitled "Weld Training System and Method," now U.S. Pat. No. 10,861,345, which is a continuation of U.S. patent application Ser. No. 14/462,286, filed Aug. 18, 2014, entitled "Weld Training System and Method," now U.S. Pat. No. 9,875,665. The entireties of U.S. patent application Ser. No. 15/840,104 and U.S. patent application Ser. No. 14/462,286 are incorporated herein by reference.

BACKGROUND

This disclosure relates generally to welding systems, and more particularly, to a portable welding system that may be used for as a tool for training and/or recruiting purposes.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

In preparation for performing manual welding operations, welding operators may be trained using a welding system (e.g., welding training system). The welding system may be designed to train welding operators with the proper techniques for performing various welding operations. Various training methods and systems may be utilized within the welding systems. However, these training methods and systems are generally large and unwieldy, and may be difficult to setup and transport to different training locations. Accordingly, it may be beneficial to provide for portable welding systems, such as portable welding systems that are easy to transport and setup in various types of training locations.

BRIEF DESCRIPTION

In an embodiment, a weld training system having a weld training device, a sensing device, and processing circuitry is provided. The weld training device is configured to perform a virtual welding procedure on a simulated weld joint via a virtual reality interface. The simulated weld joint is simulated on a work surface. The sensing device is configured to detect position or orientation information of the weld training device via processing circuitry. In addition, at least one of the weld training device, the work surface, the sensing device, or the processing circuitry are removably disposed within an interior volume of a portable enclosure. The portable enclosure is configured to be transported by an operator of the weld training system.

In another embodiment, a method is provided. The method includes operating a weld training system within a portable enclosure. The portable enclosure is configured to be transported by an operator of the weld training system. Operating the weld training system includes performing, via a weld training device, a virtual welding procedure on a simulated weld joint. The weld joint is simulated on a work surface via a virtual reality interface. Operating the weld training system also includes receiving, via a sensing device, position or orientation information of the weld training device. In addition, operating the weld training system includes determining, via processing circuitry, an updated position or orientation information of the weld training device based on the received position or orientation information of the weld training device. The updated position or orientation information is utilized to determine one or more current operating parameters of the virtual welding procedure. At least one of the weld training device, the work surface, the sensing device, or the processing circuitry are removably disposed within an interior volume of the portable enclosure of the weld training system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
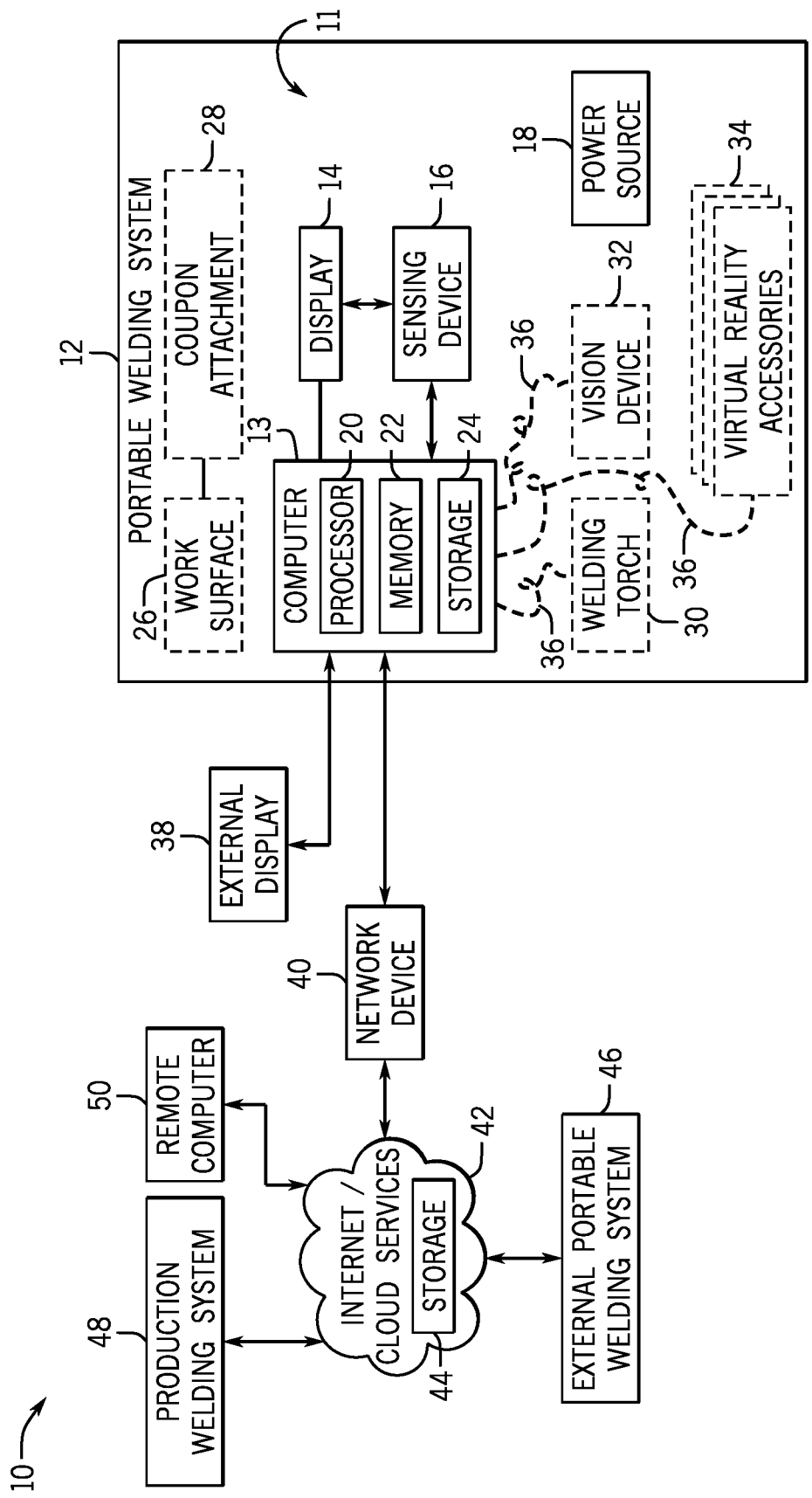
FIG. 1 is a block diagram of an embodiment of a portable weld training system in accordance with aspects of the present disclosure.

Embodiments of the systems and methods described herein relate to a weld training system that is portable and self-contained. As used herein, the weld training system may include any suitable welding related system, including, but not limited to, a welding training system, a live welding system, a simulated welding system, a virtual reality welding system, a welding training application (e.g., utilized on a computing device), a welding training system utilized on a gaming platform, and so forth. In certain embodiments, the weld training system may be configured to perform a virtual welding operation. In addition, the weld training system may be configured to perform a shielded metal arc welding (SMAW) process, a gas-metal arc welding (GMAW) process, a tungsten inert gas (TIG) welding process, a plasma cutting process, or any other type of welding process. In particular, one or more components of the weld training system may be removably disposed within an interior volume of a portable, self-contained enclosure.

In certain embodiments, a user and/or operator may easily transport the weld training system from various training and/or recruiting locations with the one or more components of the weld training system disposed within the interior volume of the portable, self-contained enclosure. For example, the portable, self-contained enclosure may be suitcase-type enclosures having any suitable attachments (e.g., straps, handles, wheels, levers, etc.) that provide mobility and that enable the user and/or operator to move the enclosure from one location to another. Further, the enclosure may protect the removably enclosed components of the weld training system from various elements (e.g., water, impact, stacking, dust, etc.) during transport and operation. In some situations, the enclosure may be a physically robust structure that enables a welding operator to assume real welding positions against the enclosure. For example, the operator and/or user may lean on the portable welding system for stability during a weld, and the enclosure may be physically robust enough to withstand such force. In addition, the components of the weld training system may be easy to assemble and/or disassemble. For example, a single user and/or operator may be able to set up and/or wrap up the components of the weld training system form the portable, self-contained enclosure in an intuitive and interactive way.

In certain embodiments, the weld training system includes components configured to enable a virtual reality environment that allows an operator and/or user to have a welding-like experience (virtual welding). In particular, one or more of these components are removably disposed within the portable, self-contained enclosure, and may be easily transported between recruiting and/or training locations by a single user and/or operator. The weld training system provides the user or a trainee with real-time feedback on relevant process parameters at the recruiting and/or training site, and also provides the user with a summary of post-weld feedback on the relevant process parameters. In certain embodiments, the weld training system can incorporate a competitive, gaming aspect to the virtual reality welding experience or the simulated welding experience, and can provide a welding score to the user based on the received feedback.

FIG. 1 is a block diagram of an embodiment of a portable weld training system 10, in accordance with aspects of the present disclosure. As noted above, embodiments of the portable welding system 10 include any suitable welding related system, including a virtual reality system that enables a virtual welding experience or a welding application utilized on the system 10 that enables a simulated welding experience. In particular, the components of the portable welding system 10 may be incorporated into a portable, self-contained enclosure 12 that is easy to transport between various training and/or recruiting locations. Further, the components of the portable welding system 10, as further described below, may be simple and easy to assemble and/or disassemble, such that a single operator is capable of setting up and/or wrapping up the system 10 within the enclosure 12 in an intuitive and interactive way. In particular, one or more components of the weld training system 10 may be removably disposed within an interior volume 11 of the portable, self-contained enclosure 12, such that the single operator may easily transport and setup the components in different training and/or recruiting locations.

The portable weld training system 10 includes a computer 13 (or a computing component), a display 14, a sensing device 16, and a power source 18. The computer 13 includes one or more processors 20, memory devices 22, and storage devices 24. The processor(s) 20 may be used to execute software, such as welding software, image processing software, sensing device software, and so forth. Moreover, the processor(s) 20 may include one or more microprocessors, such as one or more "general-purpose" microprocessors, one or more special-purpose microprocessors and/or application specific integrated circuits (ASICS), or some combination thereof. For example, the processor(s) 20 may include one or more reduced instruction set (RISC) processors.

The memory device(s) 22 may include a volatile memory, such as random access memory (RAM), and/or a nonvolatile memory, such as read-only memory (ROM). The memory device(s) 22 may store a variety of information and may be used for various purposes. For example, the memory device(s) 22 may store processor-executable instructions (e.g., firmware or software) for the processor(s) 20 to execute, such as instructions for a welding simulation, instructions to enable a virtual reality welding-like experience (e.g., virtual welding), and/or instructions for the sensing device 16. In addition, a variety of control regimes for various welding processes, along with associated settings and parameters may be stored in the storage device(s) 24 and/or memory device(s) 22, along with code configured to provide a specific output (e.g., initiate wire feed, enable gas flow, capture welding current data, detect short circuit parameters, determine amount of spatter, etc.) during operation.

The storage device(s) 24 (e.g., nonvolatile storage) may include ROM, flash memory, a hard drive, or any other suitable optical, magnetic, or solid-state storage medium, or a combination thereof. The storage device(s) 24 may store data (e.g., data corresponding to a welding operation, video and/or parameter data corresponding to a welding operation, etc.), instructions (e.g., software or firmware for the welding system, the sensing device 16, etc.), and any other suitable data. As will be appreciated, data that corresponds to a welding operation may include a video recording of the simulated or virtual reality welding operation, a simulated or virtual reality video, an orientation and/or a position of system 10 components, a work angle, a travel angle, a distance between components of the system 10, a travel speed, a proximity, a voltage, a current, a traversed path, a discontinuity analysis, welding device settings, and so forth.

The computer 13 is communicatively coupled to a display 14, and the display 14 is configured for displaying data and/or screens associated with the virtual and/or simulated welding process (e.g., to display data corresponding to a welding software). The display 14 may provide a graphical user interface to a welding operator (e.g., welding instructor, welding student). For example, the graphical user interface may provide various screens to enable a welding operator (e.g., welding student, welding gamer, welding trainee, etc.) to perform a welding task, view real-time feedback of current welding parameters, view a post-welding summary of welding task, view averages and/or results from prior welding tasks, compare and view final welding scores of one or welding operators, and so forth. In certain embodiments, the display 32 may be a touch screen display configured to receive touch inputs, and to provide data corresponding to the touch inputs to the computer 18. In some embodiments, the display 14 is configured to display information corresponding to the sensing device software, and provides a virtual and/or simulated image of the weld being performed, as further described below.

The sensing device 16 (e.g., sensor, sensing assembly, and so forth) of the portable weld training system 10 is used to sense a position of one or more welding devices and/or to sense an orientation of one or more welding devices within the portable welding system 10. The sensing device 16 may include a motion sensing device, a motion tracking device, one or more sensing devices configured to track signals output from one or more sensing coils, or generally any suitable sensing device. Furthermore, in some situations, the sensing device 16 may include one or more cameras, such as one or more infrared cameras, one or more visible spectrum cameras, one or more high dynamic range (HDR) cameras, and so forth. Further, the position and/or orientation information received by the sensing device 16 may be utilized by the computer 13 to analyze current welding parameters, and utilized by the operator to adjust a particular welding parameter.

As noted above, the sensing device 16 may be configured to sense the position and/or orientation of various components within the welding system 10. Accordingly, if the portable weld training system 10 is configured to enable a virtual reality welding experience, the sensing device 16 may be used to sense the position and/or the orientation of various virtual reality components disposed within the system 10, and receive virtual reality position and/or orientation information for each component sensed. For example, in some embodiments, the portable welding system 10 includes a work surface 26 operatively coupled to a coupon attachment 28, the weld training device 30 (e.g., virtual reality welding torch 30), a vision device 32 (e.g., virtual reality vision device 32), and/or one or more other virtual reality accessories 34 (as explained in detail with respect to FIG. 2). The work surface 26 is a flat surface configured as a welding surface that provides support for various components of the system 10 (e.g., the virtual welding torch 30) and/or a simulated or virtual work piece. In certain embodiments, the work surface 26 is a removable piece that may be removably attached or detached from the portable, self-contained enclosure 12 to create the flat surface.

The weld training device 30 (e.g., virtual reality welding torch 30, VR welding torch 30, the weld training torch 30, etc.) may be used by the welding operator (e.g., welding student, trainee, or gamer) to perform welding operations within a virtual reality welding-like experience. For example, the weld training device 30 may be any 3-D controller (e.g., gaming control, gaming torch, artificial welding torch, etc.) that simulates the experience of a typical welding torch device (e.g., may be stiff, rigid, and/or heavy) and that is configured to mimic the functions of a welding torch in a typical welding operation. The weld training device 30 may communicate with the computer 13 via wired connections 36 and/or wireless communications. In some embodiments, the weld training device 30 may be configured to look and feel (e.g., size, weight, configuration, etc.) like a typical welding torch. Further, the weld training device 30 may include various sensors (e.g., accelerometers, vibration sensors, motion sensors and/or trackers, optical sensors, GPS-aided sensors, wireless motion and/or tracking tags, orthogonal coils configured to output a signal, etc.) that are utilized by the sensing device 16 to obtain position and/or orientation information of the weld training device 30. In some embodiments, the weld training device 30 may be configured with a user interface to receive inputs from the welding operator, control circuitry to process the inputs, and a communication interface configured to provide the inputs to another device. Further in some situations, the weld training device 30 may include one or more display and/or indicators to provide data to the welding operator. In some embodiments, the weld training device 30 may be removably disposed within the interior volume 11 of the portable, self-contained enclosure 12 to allow a single operator to easily transport the weld training device 30 and/or other components from one location to another.

The virtual reality vision device 32 (e.g., VR vision device 32) may be a head-mounted virtual reality display, such as goggles, a helmet, or any head-piece that enables the user wearing the device 32 to be immersed in the virtual reality environment (e.g., virtual reality welding-like environment). The VR vision device 32 may communicate with the computer 13 via wired connections 36 and/or wireless communications. Further, in certain embodiments, the environment visualized by the user via the VR vision device 32 may also be projected onto the display 14 or on an external display 38 for other viewers to visualize. In addition, in some situations, the portable welding device 10 may forgo vision device 32, and may display the welding-like environment directly on the display 14, or on the external display 38. In some situations, the VR vision device 32 may also include various sensors (e.g., accelerometers, vibration sensors, motion sensors and/or trackers, optical sensors, GPS-aided sensors, wireless motion and/or tracking tags, orthogonal coils configured to output a signal, etc.) that are utilized by the sensing device 16 to obtain position and/or orientation information of the vision device 32. In some embodiments, the VR vision device 32 may be removably disposed within the interior volume 11 of the portable, self-contained enclosure 12 to allow a single operator to easily transport the VR vision device 32 and/or other components from one location to another.

In some embodiments, one or more other virtual reality accessories 34 (as explained in detail with respect to FIG. 2) may be utilized by the portable welding system 10. For example, in some situations, the virtual reality welding-like experience may be created with virtual reality components such as virtual reality welding gloves, auditory accessories (e.g., speakers, headphones, etc.) that replicate welding sounds, and/or additional visual components (e.g., accessory devices to the vision device 32 that enable the user to see both virtual and real components). In some situations, these components may also include various sensors (e.g., accelerometers, vibration sensors, motion sensors and/or trackers, optical sensors, GPS-aided sensors, wireless motion and/or tracking tags, orthogonal coils configured to output a signal, etc.) that are utilized by the sensing device 16 to obtain position and/or orientation information. For example, the sensing device 16 may obtain position and/or orientation information from the welding gloves. The VR accessories 34 may communicate with the computer 13 via wired connections 36 and/or wireless communications. In some embodiments, the VR accessories 34 may be removably disposed within the interior volume 11 of the portable, self-contained enclosure 12 to allow a single operator to easily transport the VR accessories 34 and/or other components from one location to another.

An external display 38 is coupled to the computer 13 to enable an individual located remotely from the portable welding system 10 to view data corresponding to the welding system 10. Furthermore, a network device 40 is coupled to the computer 13 to enable the computer 13 to communicate with other devices connected to the Internet or cloud services 42 (e.g., for providing welding results to another device and/or for receiving welding results from another device). In some embodiments, the cloud services 42 include a storage 44 configured to store information for a plurality of welding operators utilizing a plurality of remote welding systems 10. For example, the storage 44 is configured to store, for each welding operator, user identification information, historical weld information, and/or historical welding scores. Further, the network device 40 may enable the computer 13 to communicate with an external portable welding system 46, a production welding system 48, and/or a remote computer 50. As may be appreciated, the portable welding system 10 described herein may be used to simulate and/or recreate the welding experience for welding students in a cost effective and convenient manner. Indeed, the portable welding system 10 described herein may allow a welding instructor to easily transport the system 10 via the enclosure 12 to various locations, easily setup the system 10 within a compact space, and introduce a welding experience to one or more welding students in an interactive manner Furthermore, the welding system 10 is configured to integrate real welding with virtual reality and/or simulated welding in a stimulating and interactive manner to train welding students for high quality production welding.

Figure 2:
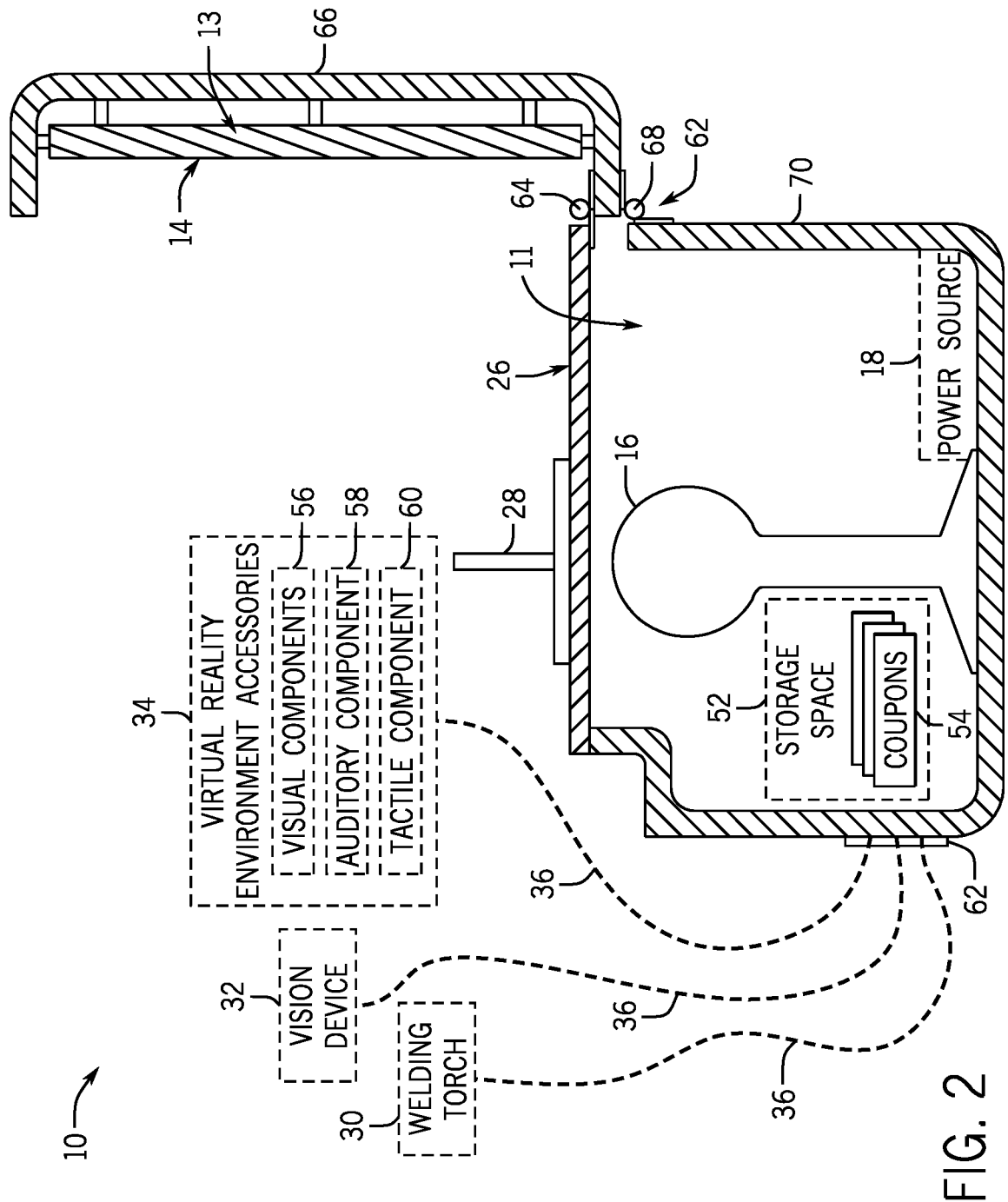
FIG. 2 is a block diagram of an embodiment of the portable weld training system of FIG. 1, where the portable weld training system includes components to enable a virtual reality welding system.

FIG. 2 is a block diagram of an embodiment of the portable weld training system 10 of FIG. 1, where the components of the portable weld training system 10 may be removably disposed within the enclosure 12 for easy transport and increased mobility. In particular, the components of the portable weld training system 10 enable a virtual reality welding-like experience (e.g., virtual welding experience) for welding operators. For example, the enclosure 12 includes the computer 13, the display 14, the sensing device 16, the power source 18, the work surface 26, and the coupon attachment 28. Further, the enclosure also includes a storage space 52 within the interior volume 11 where the weld training device 30, the vision device 32, the coupons 54, and various other virtual reality accessories 34 (e.g., the visual components 56, the auditory components 58, and/or the tactile components 60) may be removably stored when not in use and/or for transport between training/recruiting locations.

It should be noted that prior to commencing a virtual reality welding-like experience, the weld training device 30, the vision device 32, the coupons 54, and the various other virtual reality accessories 34 may be removed from the storage space 52 and communicatively coupled to the portable welding system 10 via wired connections 26 and/or wireless connections. For example, the weld training device 30 may be plugged into one or more inputs 62 of the enclosure 12 that engage with the computer 13. As a further example, in other situations, the weld training device 30 may be wirelessly coupled or paired with the computer 13 prior to use. Likewise, the VR vision device 32 may be removed from the storage space 52 and plugged into the one or more inputs 62 of the enclosure 12, and may be operatively configured to provide information to the computer 13 via the wired connections 36 or wireless connections. In some embodiments, the power source of the enclosure 12 may be plugged into an outlet to provide a direct source of power to the components of the system 10, and/or to charge a battery source (e.g., battery pack, rechargeable battery, disposable/replaceable batteries) disposed within the power source 18. Further, in some embodiments, the components of the welding system 10 may receive power from the power source 18 (e.g., converted power if necessary), or an individual battery or any other suitable powering mechanism may power each component of the system 10. It should be noted that in certain embodiments, the components of the weld training system 10 may operate on the portable battery source (e.g., battery pack, rechargeable battery, disposable/replaceable batteries) alone, independent of an external power source, thus providing greater mobility and portability to the system 10. For example, the power source 18 may be may be removably disposed within the interior volume 11 of the portable, self-contained enclosure 12 to provide power to the one or more components as they are moved from one location to another by the user.

Once the system 10 is powered and configured for a virtual and/or simulated welding experience, the welding operator may perform virtual and/or simulated welds on the work surface 26 (e.g., welding surface 26). The work surface 26 may include the coupon attachment 28, which allows one or more coupons to snap into the work surface 26. In some situations, the coupons enable the position and/or orientation of a work piece to be provided to the welding software of the portable welding system 10 to calibrate the welding system 10. One or more coupons 54 may be selected by the welding operator and may be used by the welding system 10 to calibrate the position and/or orientation of the work surface 26 relative to the sensing device 16 without a separate calibration device. In certain embodiments, the coupons 54 attached to the coupon attachment 28 may be positioned at predetermined locations on the welding surface 26. Furthermore, the welding software may be programmed to use the predetermined locations to determine the position and/or the orientation of the work surface 26. Further, it should be noted that in some embodiments, when the one or more coupons 54 are snapped into the coupon attachment 28 on the work surface 26, the weld training system 10 may not need to be calibrated before the virtual welding-like process.

During the virtual welding-like process, the welding operator may be immersed within the virtual reality environment via the various virtual reality components and attachments within the system 10. For example, the weld training device 30 may be utilized to create a virtual reality or simulated weld on the work surface 26. The VR vision device 32 may be utilized to visualize the virtual welding-like process, including visualizing the VR weld formed on the work surface 26. In certain embodiments, other virtual reality accessories 34 may be engaged to further enhance the virtual reality welding environment. For example, various visual components 56 may include glasses or attachments to the vision device 32 that enable the welding operator to see both real and virtual reality components of the welding environment. Further, various auditory components 58, such as additional speakers or headphones, may be utilized to simulate the sounds of a typical welding process. In addition, various tactile components 60, such as virtual reality control devices (e.g., VR gloves) having wired connections 36 and/or wireless communications with the computer 13, may be utilized to further create a virtual reality welding-like experience that closely mimics the welding operator's true tactile motions.

As noted above, the enclosure 12 configured to house the components of the welding system 10 is a portable, self-contained enclosure 12 that is easy to transport between various training and/or recruiting locations. Indeed, the dimensions of the portable, self-contained enclosure 12 may be such that any operator and/or user are capable of transporting the enclosure 12 without the need of external machines. For example, in some situations, the portable, self-contained enclosure 12 is a suitcase like structure that may be lifted, carried, wheeled, rolled, or otherwise moved from one location to another by one or more operators or users. As can be appreciated by one skilled in the art, the enclosure 12 has attachments (not illustrated) that improve mobility, such as wheel attachments, handles, extendable handles, buckles, straps, etc., that allow the enclosure 12 to be transported, for example, by a user and/or operator. Further, it should be noted that while the enclosure 12 has features that enable configuration with external devices, in certain embodiments, the enclosure 12 is self-contained such that the weld training system 10 is fully operational independent of any external devices, such as external displays, external computing systems, or external power sources. In some situations, the portable, self-contained enclosure 12 may be divided into one or more portable, self-contained enclosures 12, each configured to house or removably enclose for transport one or more components of the weld training system 10. In such situations, the components disposed within each enclosure 12 may communicate via wired and/or wireless communications.

In particular, the enclosure 12 includes one or more hinges 62 that enable the enclosure 12 to securely contain the components within during transport or when not in use. For example, a first hinge 64 is utilized to fold the work surface 26 into a cover 68 (e.g., lid, top, etc.) of the enclosure 12. As a further example, a second hinge 68 is utilized to secure the cover 68 of the enclosure 12 to an enclosure body 70. In certain embodiments, the work surface 26 may be spatially rearranged within the weld training system 10 based on the desired functionality. For example, in certain embodiments, the work surface 26 may be coupled (e.g., clip-on attachments, fasteners, retaining devices, removable hinges, etc.) vertically and/or horizontally within the enclosure 12 based on the welding experience desired by the user. Further, the work surface 26 may be detached and stored within the storage space 52 during transport or when it is not in use.

As noted above, the enclosure 12 is formed of any sturdy material (e.g., plastic, metal, etc.) that protects the components within from various elements (e.g., water, impact, stacking, dust, etc.) during transport and operation. Indeed, the enclosure 12 may be physically robust enough that it enables a welding operator to assume real welding positions against the enclosure 12. For example, the welding operator may lean against the enclosure 12 while creating a virtual reality weld on the work surface 26 for stability, and the enclosure 12 may be physically robust enough to withstand such force without moving. It should be noted that the enclosure 12 may be formed of any material, and in any shape, so long as the enclosure 12 is large enough to fit the desired components required for the portable weld training system 10 and sturdy enough to withstand typical forces encountered during the welding process.

Figure 3:
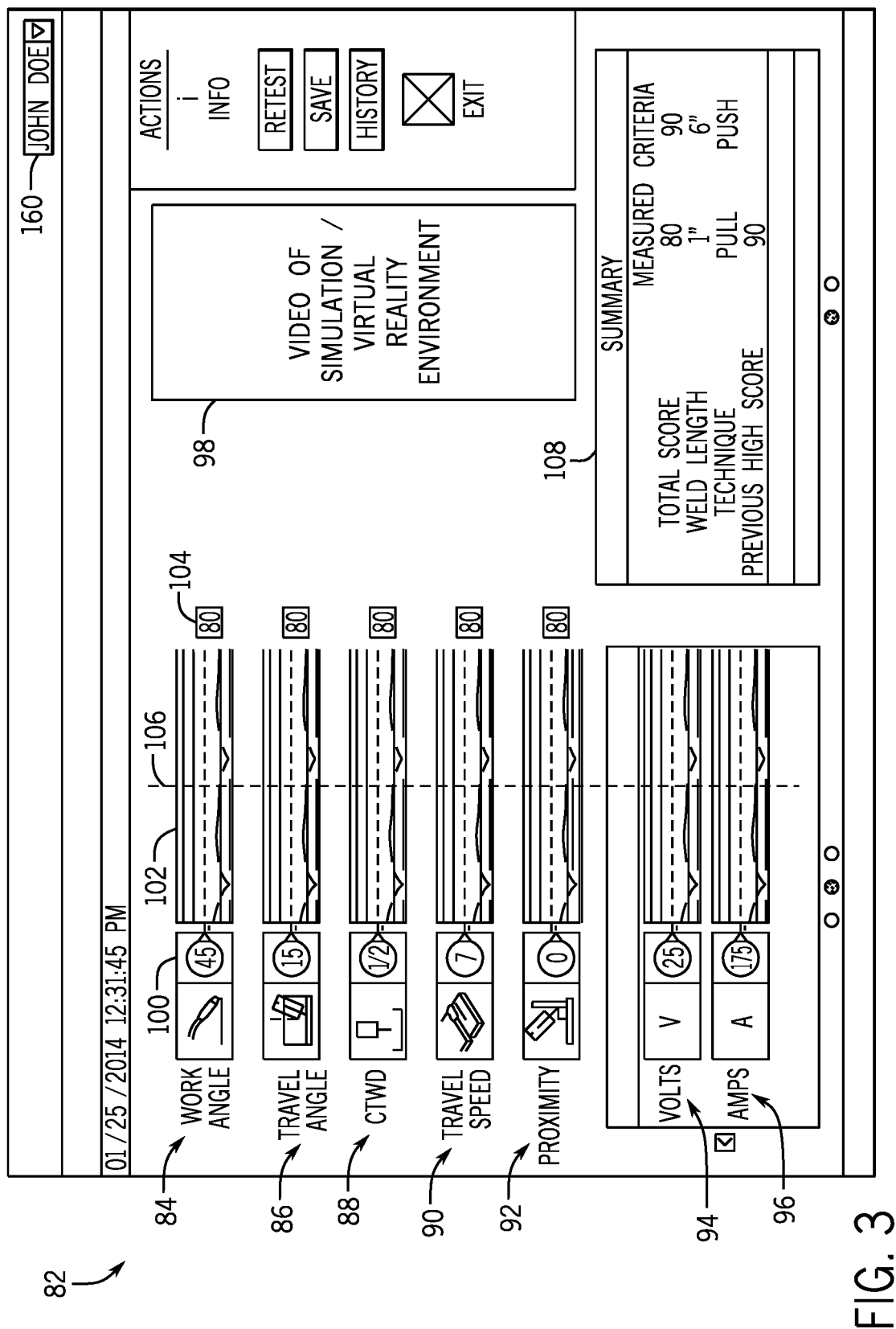
FIG. 3 is an embodiment of a screen illustrating data corresponding to a weld, in accordance with aspects of the present disclosure.

FIG. 3 is an embodiment of a screen 82 illustrating data corresponding to a virtual and/or simulated weld, such as those generated by the portable weld training system 10, in accordance with aspects of the present disclosure. The screen 82 may be produced by the welding software disposed on the portable welding system 10, and may be displayed on the display 14, the external display 38, and/or the vision device 32. The screen 82 illustrates parameters that may be graphically displayed to a welding operator before, during, and/or after performing a simulated and/or virtual welding operation. For example, the parameters may include a work angle 84, a travel angle 86, a contact tip to work piece distance 88 (e.g., CTWD 88), a welding torch travel speed 90, a proximity of the welding torch in relation to the work piece 92, a simulated welding voltage 94, a simulated welding current 96, a welding torch orientation, a welding torch position, an aim of the welding torch, a video replay of the simulation and/virtual reality weld 98, and so forth.

As illustrated, graphically illustrated parameters may include an indication 100 of a current value of a parameter (e.g., while performing a welding assignment). Furthermore, a graph 102 may show a history of the value of the parameter, and a score 104 may show an overall percentage that corresponds to how much time during the welding assignment that the welding operator was within a range of acceptable values. As noted above, a video replay 98 of a welding assignment may be provided on the screen 82. The video replay 98 may show live video of a welding operator performing the simulated weld, live video of the welding operator performing a virtual reality weld, a live video of the simulated or virtual reality weld itself, a video of the welding parameters, a video of the simulated and/or virtual reality welding environment, and so forth.

In some embodiments, a time 106 during a weld may be selected by a welding operator. By selecting the time 106, the welding operator may view the video replay 106 in conjunction with the welding parameters as they were at the selected time 106 in order to establish a correlation between the welding parameters and the video replay 98. The welding software may be configured to recreate welding data based at least partly on welding parameter data, to synchronize the video replay 98 with the recreated welding data, and to provide the synchronized video replay 98 and recreated welding data to the display 14 or the external display 38. Further, in some embodiments, a summary of the post-welding data and/or score may be displayed on a summary page 108 for each welding operator 110. It should be noted that in some situations, the display 82 may display a comparison of total scores for each welding individual 110. Indeed, the weld training system may include or utilize any number of weld training features (e.g., a total welding score) or techniques (e.g., comparing weld training information) previously disclosed in U.S. patent application Ser. No. 13/838,158, filed Mar. 15, 2013, which is hereby incorporated by reference.

While only certain features have been illustrated and described herein, many modifications and changes will occur to those skilled in the art. It is, therefore, to be understood that the appended claims are intended to cover all such modifications and changes as fall within the scope of the claims.

What is claimed is:

1. A weld training system, comprising:
a weld training device configured to perform a simulated welding procedure on a simulated weld joint;
a work surface comprising the simulated weld joint;
a sensing device configured to track weld training device location information during the simulated welding procedure;
a visual interface configured to display results of the simulated welding procedure based on the weld training device location information; and
an enclosure comprising an interior volume configured to house within its interior the visual interface, the work surface, and the sensing device, wherein the work surface is coupled to the enclosure.

2. The system of claim 1, wherein the enclosure is portable and configured to house the visual interface and the work surface within the interior of the enclosure during the simulated welding procedure.

3. The system of claim 2, wherein the enclosure is further configured to be transported by an operator of the weld training system.

4. The system of claim 2, wherein the enclosure is self-contained and configured to perform a simulated welding procedure independently of at least one of an external computing system, an external display, or an external power source.

5. The system of claim 1, wherein the weld training device comprises a simulated welding torch configured to simulate welding functions of a real-world welding torch.

6. The system of claim 1, wherein the enclosure is in an open position during the simulated welding procedure.

7. The system of claim 1, wherein the enclosure comprises a cover and a body coupled via a hinge, and wherein when the enclosure is in an open position the work surface is accessible to perform the simulated welding procedure.

8. A weld training system, comprising:
a weld training device configured to perform a simulated welding procedure on a simulated weld joint;
a work surface comprising the simulated weld joint;
a sensing device configured to track weld training device location information during the simulated welding procedure;

a visual interface configured to display results of the simulated welding procedure based on the weld training device location information; and an enclosure comprising an interior volume configured to house within its interior the visual interface, the work surface, and the sensing device, wherein the work surface and the visual interface are attached to the enclosure during the simulated welding procedure.

9. The system of claim 1, wherein the enclosure is a suitcase-type enclosure in which two portions forming the enclosure are coupled via hinges.

10. The system of claim 1, wherein the display comprises a touch screen display.

11. The system of claim 1, wherein the visual interface comprises a virtual reality vision device.

12. The system of claim 11, wherein the virtual reality vision device comprises at least one of goggles, a helmet, or a head-piece.

13. A weld training system, comprising:

a weld training device configured to perform a simulated welding procedure on a simulated weld joint;

a work surface comprising the simulated weld joint;

a sensing device configured to track weld training device location information during the simulated welding procedure;

a visual interface configured to display results of the simulated welding procedure based on the weld training device location information; and an enclosure comprising an interior volume configured to house within its interior the visual interface, the work surface, and the sensing device, wherein the sensing device is coupled to the enclosure.

* * * * *